United States Patent
Fukuyama et al.

[11] Patent Number: 5,536,986
[45] Date of Patent: Jul. 16, 1996

[54] SPINDLE MOTOR

[75] Inventors: Koji Fukuyama, Komagane; Kazuyoshi Horikoshi, Iijima-machi; Satoshi Nakajima, Iida; Tokumon Ogawa; Yoichi Kitamura, both of Komagane; Kazuto Miyajima, Ina, all of Japan

[73] Assignee: Nagano Nidec Corporation, Nagano-Ken, Japan

[21] Appl. No.: 324,095

[22] Filed: Oct. 14, 1994

Related U.S. Application Data

[62] Division of Ser. No. 4,098, Jan. 15, 1993, Pat. No. 5,396,134.

[30] Foreign Application Priority Data

Jan. 22, 1992 [JP] Japan ..................... 4-29949
Apr. 14, 1992 [JP] Japan ..................... 4-121446
May 29, 1992 [JP] Japan ..................... 4-164389

[51] Int. Cl.$^6$ ............. H02K 15/00; H02K 7/14; H02K 7/08
[52] U.S. Cl. ............. 310/67 R; 310/42; 310/90
[58] Field of Search ................... 310/67 R, 90, 310/42; 360/98.07, 99.04, 99.08; 277/80, 135; 384/133, 446, 447, 462, 464, 512

[56] References Cited

U.S. PATENT DOCUMENTS 4,130,770  12/1978  Wrobel ..................... 310/67 R

Primary Examiner—Clayton E. LaBalle
Attorney, Agent, or Firm—McCormick, Paulding & Huber

[57] ABSTRACT

A spindle motor comprising a bracket, a shaft member provided on the bracket, a rotor rotatably mounted to the shaft member through a pair of bearings, a rotor magnet mounted to the rotors, a stator disposed in opposite relation to the rotor magnet, and magnetic fluid sealing means respectively disposed outwardly of a pair of the bearings. The shaft member is provided with an air passage extending in the axial direction, and a communication passage for communicating the air passage with a space between a pair of the bearings. A cap member which is improved in its structure is disposed outwardly of one of the paired bearings. An annular projection for positioning the rotor magnet concentrically with respect to the rotor is provided on a magnet mount portion of the rotor.

3 Claims, 3 Drawing Sheets

SPINDLE MOTOR

This is a divisional of application Ser. No. 08/004,098 filed on Jan. 15, 1993, now U.S. Pat. No. 5,396,134.

FIELD OF THE INVENTION

The present invention relates to a spindle motor for driving a recording disk such as a magnetic disk to rotate.

PRIOR ART OF THE INVENTION

As disclosed in U.S. Pat. No. 5,047,677, for example, a spindle motor generally comprises a bracket mounted to a disk drive, a shaft :member provided on the bracket, a rotor rotatably mounted to the shaft member through a pair of bearings, a rotor magnet mounted to the rotor, and a stator disposed in opposite relation to the rotor magnet. A magnetic fluid sealing means is disposed outwardly of a pair of the bearings (on the same side as a free end of the shaft member) and serves to prevent grease used in the bearings from scattering to the outside. Also, a labyrinth seal means is disposed between the bracket and the rotor and serves to prevent the grease in the bearings from scattering to the outside through therebetween.

However, such a spindle motor has the drawback that because the labyrinth seal means cannot positively seal between the inside and the outside of the motor, some amount of grease inevitably scatters to the outside of the motor through the labyrinth seal means.

In order to eliminate the above-mentioned drawback, it could be thought to arrange another magnetic fluid sealing means on the opposite side of a pair of the bearings (i.e., on the side nearer to a base end of the shaft member) as well. With this arrangement, however, the gap between the shaft member and the rotor is enclosed by a magnetic fluid, hence the space between both the sealing means is completely sealed. Accordingly, upon a change in temperature, i.e., upon being subjected to a high temperature, there gives rise to a problem that air in the space between both the sealing means is expanded and the magnetic fluid scatters outward from both the sealing means. This phenomenon also occurs when the pressure within the disk drive is lowered due to a change in atmospheric pressure.

Further, in the case of using the magnetic fluid sealing means as a seal means like the motor disclosed in the above-cited U.S. Pat. No. 5,047,677, a cap member for preventing scatter of time magnetic fluid is preferably disposed outwardly of the magnetic fluid sealing means as disclosed in U.S. Pat. No. 5,009,436, for example.

The provision of such a cap member, however, gives rise to the following problem. More specifically, in the case where the cap member is disposed to directly pile over a magnetic fluid holding means of the magnetic fluid sealing means as illustrated in FIGS. 8, 9 and 11 of the above-cited U.S. Pat. No. 5,009,436, for example, an adhesive for fixing the magnetic fluid holding means and the cap member is not sufficiently applied to the magnetic fluid holding means on the lower side. As a result, the magnetic fluid holding means cannot be fixed in a sufficient and positive manner. On the other hand, in the case where the cap member is disposed to be spaced from the magnetic fluid holding means as illustrated in FIGS. 10 and 12 of the above-cited U.S. Pat. No. 5,009,436, for example, an adhesive must be separately applied to the magnetic fluid holding means and the cap member and, as a result, an operation of applying the adhesive becomes troublesome.

Moreover, the rotor magnet is fixed directly or via a yoke to the rotor by using an adhesive as disclosed in the above-cited U.S. Pat. No. 5,047,677 or U.S. Pat. No. 5,045,738, for example.

But it is so difficult to apply the adhesive over the inner circumferential surface of the rotor or the yoke with an essentially uniform thickness that the rotor magnet may be eccentrically mounted to the rotor or the yoke. As a result, the gap between the stator and the rotor magnet may not become uniform, thus causing unevenness in rotation of the rotor.

SUMMARY OF THE INVENTION

A first object of the present invention is to provide a spindle motor in which a magnetic fluid can be positively prevented from scattering even when magnetic fluid sealing means are provided on both sides of a pair of bearings.

A second object of the present invention is to provide a spindle motor in which the magnetic fluid sealing means and a cap member can be easily and positively fixed by using an adhesive.

A third object of the present invention is to provide a spindle motor in which a rotor magnet can be concentrically mounted to a magnet mount portion of a rotor.

Other objects and features of the present invention will be easily understood from the following description.

DETAILED DESCRIPTION OF THE PREFERRED EMBODIMENTS

Figure 1:
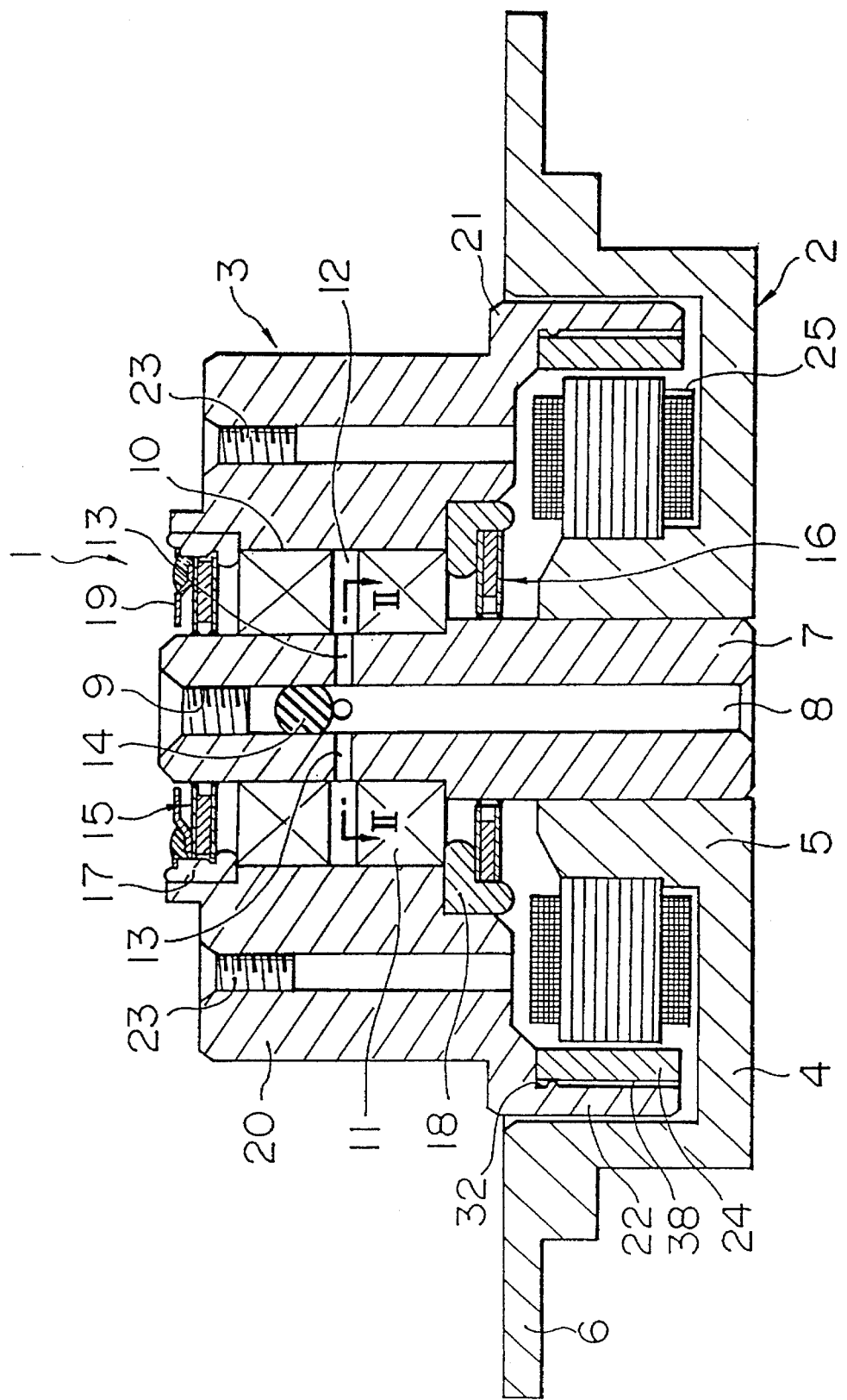
FIG. 1 is a sectional view showing one embodiment of a spindle motor according to the present invention.

Hereinafter, one preferred embodiment of a spindle motor according to the present invention will be described with reference to the attached drawings.

An illustrated spindle motor 1 includes a substantially circular bracket 2 mounted to a disk drive, and a rotor 3 rotatable relative to the bracket 2. The bracket 2 comprises a cylindrical bracket body 4 with the bottom, a boss portion 5 positioned at the center of the bracket body 4, and a flange 6 extending outwardly from the outer circumference of the bracket body 4 at its upper end.

A shaft member 7 made of magnetic material is fixedly press-fitted into the boss portion 5, and a penetration hole 8 is formed to axially extend through the center of the shaft member 8 over its entire length. The penetration hole 8 has one end which is open at the under surface of the bracket 2, and the other end provided with a female-threaded fixture portion 9 through which the free end of the shaft member is fixed to a cover of the disk drive by screw fitting.

Figure 2:
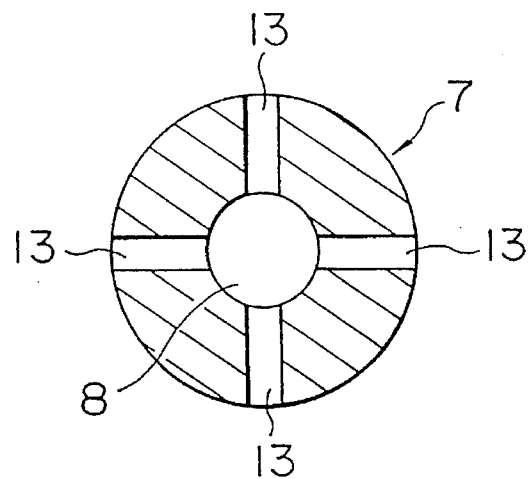
FIG. 2 is a sectional view taken along line II—II in FIG. 1.

A pair of ball bearings 10, 11 are secured to the outer circumference of the shaft member 7 in its upper portion so that the rotor 3 is rotatably supported through a pair of the ball bearings 10, 11. At a position of the shaft member 7 facing a space 12 between both the ball bearings, as shown in FIG. 2, there are formed four radial communication holes 13 with equal angular intervals for communicating the space 12 between both the ball bearings with the penetration hole 8. Also, an elastic ball 14 is inserted in the penetration hole 8 at a position intermediate the female-threaded fixture portion 9 and the communication holes 13. The elastic ball 14 which constitutes a seal means can be formed of synthetic rubber material, for example. By so providing the elastic ball 14, the communication of the space 12 between a pair of the ball bearings 10, 11 with a disk chamber (which accommodates the rotor 3 and the bracket 2 at its upper surface) is cut off, while the space 12 is held in communication with the outside of the motor (i.e., the outside of the disk chamber) via the communication holes 13 and the penetration hole 8 (these holes constituting an air passage).

Outwardly of both the ball bearings 10, 11 between the shaft member 7 and the rotor 3, there are mounted magnetic fluid sealing means 15, 16 via bushings 17, 18, respectively.

Figure 3:
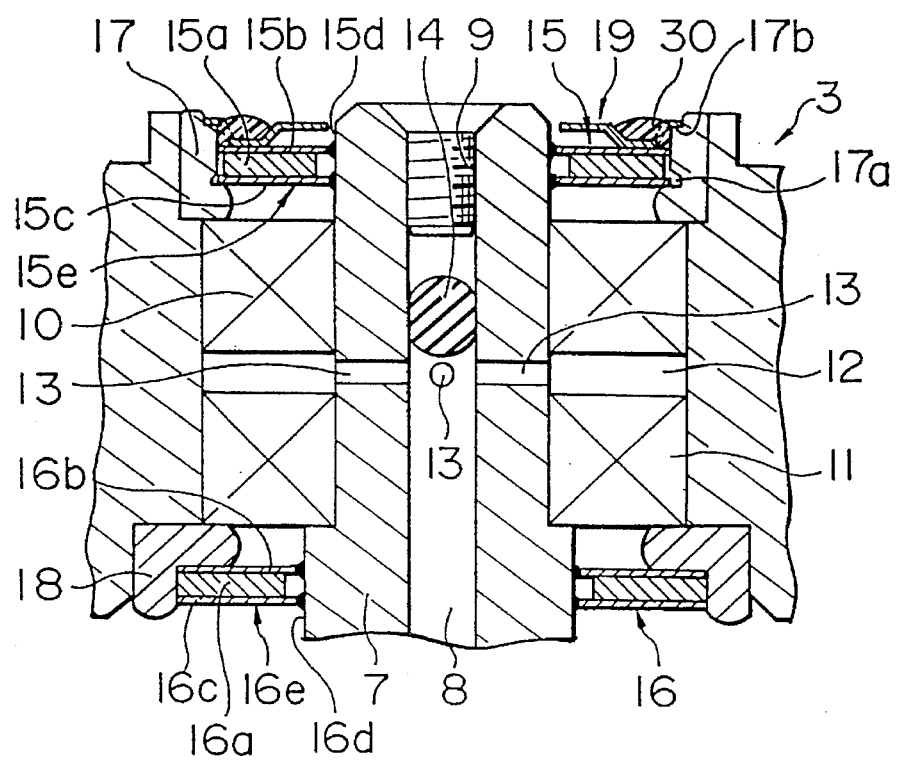
FIG. 3 is a partial enlarged sectional view showing a pair of bearings and thereabout in the spindle motor of FIG. 1.

The sealing means 15, 16 respectively include magnetic fluid holding means 15e, 15e which comprise, as shown in FIG. 3, ring-shaped permanent magnets 15a, 16a magnetized in the axial direction and pairs of pole pieces 15b, 15c; 16b, 16c attached to the upper and lower surfaces of the permanent magnets. Magnetic fluids 15d, 16d are injected to respective gaps between the pole pieces 15b, 15c, 16b, 16c and the shaft member 7, whereby a space between both the magnetic fluid sealing means 15 and 16 is sealed. A cap member 19 is attached to the upper surface of the magnetic fluid sealing means 15 on the upper side. The cap member 19 will be described later.

The rotor 3 comprises a cylindrical hub portion 20, a flange portion 21 provided at a lower end of the hub portion 20, and a rotor portion 22 extending downwardly from the outer circumference of the flange portion 21. The hub portion 20 is supported to the shaft member through both the ball bearings 10, 11 and a plurality of recording disks (not shown) are fitted over the outer circumference of the hub portion 20. The recording disks are fixedly held in sandwich relation between the flange portion 21 and a clamp member (not shown) fitted from above. The clamp member is secured in place by screws respectively screwed into partly threaded holes 23 of the hub portion 20.

An annular rotor magnet 24 is fixed to the inner circumferential surface of the rotor portion 22. A stator 25 is disposed in opposite relation to the rotor magnet 24 and fixed to the outer circumference of the boss portion 5 of the bracket 2. A manner of mounting the rotor magnet 24 will be described later.

With the spindle motor thus constructed, since the space 12 between both the ball bearings 10 and 11 is held open to the underside of the bracket 2, i.e., the outside of the disk chamber, via the communication holes 13 and the penetration hole 8, the space between the magnetic fluid sealing means 15 and 16 is not isolated from the outside so that, when an air pressure in the space 12 rises (or lowers), air is discharged to the outside (or introduced from the outside) via the communication holes 13 and the penetration hole 8. Accordingly, upon a rise in temperature or a change in pressure, the air pressure between both the magnetic fluid sealing means 15 and 16 is essentially subjected to no variations, hence the magnetic fluid is positively prevented from scattering.

Furthermore, neither special structure nor difficult machining are required to communicate the space between both the magnetic fluid sealing means 15 and 16 with the outside. Thus, it is only needed to make holes in the shaft member 7 and insert the elastic ball 14, meaning that manufacture of the spindle motor is very simple.

Additionally, since the female-threaded fixture portion 9 can be formed by utilizing the other end portion of the penetration hole 8, it is possible to easily provide the female-threaded :fixture portion 9 for fixing the shaft member 7.

Figure 4:
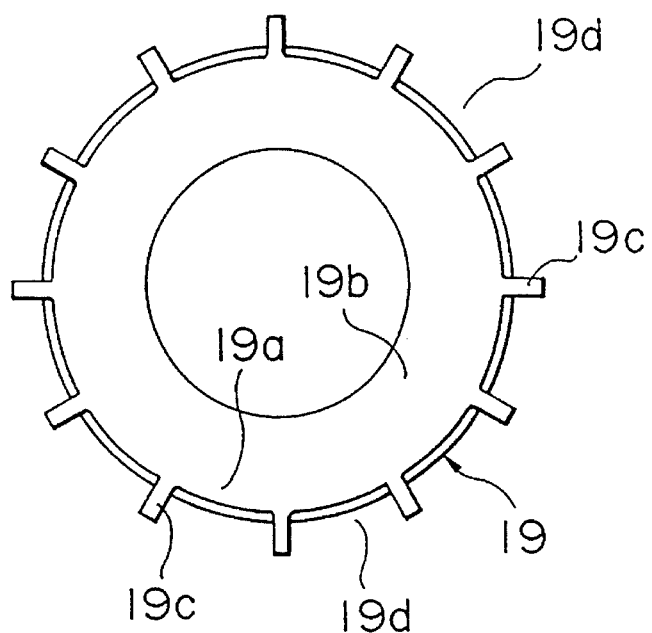
FIG. 4 is a top plan view showing a cap member in the spindle motor of FIG. 1.
Figure 5:
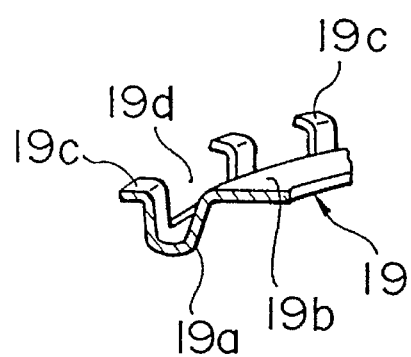
FIG. 5 is a fragmentary perspective view, partially sectioned, of the cap member in FIG. 4.

The cap member 19 and a manner of mounting the same will be explained below by referring to FIGS. 4 and 5 along with FIG. 2.

The illustrated cap member 19 comprises an annular support portion 19a having a substantially U-shaped cross-section, a scatter preventing portion 19b provided at the inner circumference of the annular support portion 19a and projecting inwardly therefrom in the radial direction, and an attachment portion 19c provided at the outer circumference of the annular support portion 19a and extending outwardly therefrom in the radial direction. In the illustrated embodiments, there are formed a plurality of (for example, twelve) cut-outs 19d of relatively large size with equal intervals in the circumferential direction, each cutout 19d being extended from an outer wall of the support portion 19a to the attachment portion 19c of the cap member 19 while leaving rectangular apertures therein. Although the cutouts 19d are each shown as extending from the support portion 19a to the attachment portion 19c for easier application of an adhesive 30 described later, a desired effect can also be achieved by forming the cut-outs in either the support portion 19a or the attachment portion 19c. However, if the cut-outs 19d are relatively small in size, it would be difficult to apply the adhesive 30.

The bushing 17 has a substantially L-shaped cross-section and includes an annular stepped portion 17a on the lower side and an annular shoulder portion 17b on the upper side. The outer circumferential edge of the magnetic fluid holding means 15e is positioned over the relatively large stepped portion 17a, and the attachment portion 19c of the cap member 19 is positioned over the relatively small shoulder portion 17b.

The manner of mounting the cap member 19 will be explained below.

First, the magnetic fluid holding means 15e is inserted from above such that its outer circumferential edge is positioned over the stepped portion 17a of the bushing 17. By so inserting, the outer circumferential surface of the magnetic fluid holding means 15e is brought into contact with the circumferential surface which defines the stepped portion 17a of the bushing 17, and the magnetic fluid holding means 15e is concentrically positioned with respect to the bushing 17.

Then, the cap member 19 is inserted from above. Upon this insertion, the lower surface of the support portion 19a of the cap member 19 is brought into contact with the upper surface of the magnetic fluid holding means 15e (more exactly, of the pole pieces 15b on the upper side), and the attachment portion 19c of the cap member 19 is positioned over the shoulder portion 17b of the bushing 17 such that the outer circumferential surface of the attachment portion 19c is brought into contact with the circumferential surface which defines the shoulder portion 17b of the bushing 17. As a result, the cap member 19 is concentrically positioned with respect to the bushing 17.

After that, the adhesive 30 of ultraviolet setting type is applied from above to the substantially U-shaped support portion 19a, the attachment portion 19c and the cut-outs 19d of the cap member 19. By so applying, the adhesive 30 is allowed to spread over the upper side of the substantially U-shaped support portion 19a and a base region of the attachment portion 19c, as well as over the upper surface of an outer circumferential portion of the upper pole piece 15b in the magnetic fluid holding means 15e and throughout the contiguous inner circumferential surface of the bushing 17 through the cut-outs 19d. Then, by irradiating a ultraviolet ray to the adhesive 30 from above the cap member 19, the ultraviolet ray is allowed to reach not only the adhesive 30 over the substantially U-shaped support portion 19a and the attachment portion 19c, not only the adhesive 30 below the substantially U-shaped support portion 19a and the attachment portion 19c through the cut-outs 19d, thereby setting or hardening the adhesive 30. As a result, the magnetic fluid holding means 15e, the cap member 19 and the inner circumferential surface of the bushing 17 are fixedly bonded together by the adhesive 30.

Thus, the magnetic fluid holding means 15e and the cap member 19 can be secured in place by a single operation of applying the adhesive, making it possible to provide higher manufacture efficiency than in the prior art.

It should be noted that although in the illustrated embodiment the magnetic fluid holding means 15e and the cap member 19 are fitted to the bushing 17 which is in turn mounted to the rotor 3, the cap member 19 may be attached directly to the rotor 3 while mounting the magnetic fluid holding means 15e to the bushing 17. As an alternative, the bushing 17 may be omitted to attach both the magnetic fluid holding means 15e and the cap member 19 directly to the rotor 3.

Figure 6:
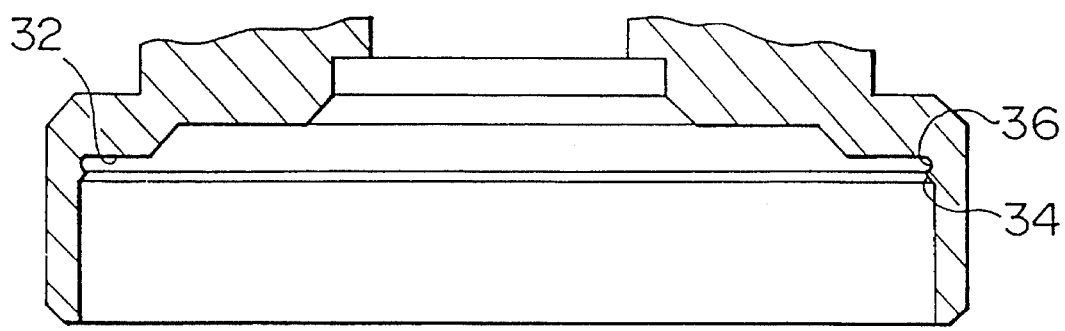
FIG. 6 is a sectional view showing a part of a rotor in the spindle motor of FIG. 1.

The manner of mounting the rotor magnet 24 will be described below by referring to FIG. 6 along with FIG. 1. The inner circumferential surface of the rotor portion 22 serves as a magnet mount portion. At the inner bottom of the rotor portion 22, there is defined a abutting bottom surface 32 which comes into abutment with the rotor magnet 24 to be inserted. Also, an annular projection 34 is provided on the inner circumferential surface of the rotor portion 22 near the inner bottom. Although the projection 34 is provided one in the illustrated embodiment, it may be provided two or more. The projection 34 serves to make smaller a contact area between the rotor portion 22 and the rotor magnet 24 for preventing damage of the rotor magnet 24, as well as to position the rotor magnet 24 concentrically with respect to the rotor portion 22 when the rotor magnet is fitted. In addition, an adhesive pit 36 is formed between the abutting bottom surface 32 and the projection 34.

The rotor magnet 24 is inserted to the rotor portion 22 with an adhesive applied beforehand over the inner circumferential surface of the rotor portion, and fixed to the rotor 31 by being press-fitted with the projection 34. Since a gap 38 is formed between the rotor magnet 24 and the rotor portion 22 due to the presence of the projection 34, the adhesive is allowed to stay and set in the gap 38 and the adhesive pit 36 without entering between a distal end of the projection 34 and the rotor magnet 24.

Accordingly, the rotor magnet 24 is assembled in concentric relation to the rotor portion 22 and a thickness of the adhesive is made almost uniform in the gap 38, with the result of that rotation of the rotor 3 can be more balanced than in the prior art. Further, because of the adhesive having an almost uniform thickness throughout the inner circumference of the rotor portion 22, the rotor magnet 24 can be exactly and positively mounted in the rotor portion 22.

The annular projection 34 serving to position the rotor magnet 24 is provided on the rotor portion 22 in the illustrated embodiment, but to the contrary, it may be provided on the outer circumferential surface of the rotor magnet 24. In this case, for the purpose of preventing damage of the rotor magnet 24, the annular projection 34 is preferably provided in a rear end portion of the rotor magnet as viewed in the direction of its insertion.

Also, although the rotor magnet 24 is directly mounted to the rotor portion 22 in the illustrated embodiment, that arrangement should not be regarded as limiting and the rotor magnet may be mounted to the rotor portion 22 via a yoke. In this case, such a yoke constitutes a part of the rotor portion 22.

It should be noted that one embodiment of the spindle motor according to the present invention has been described above, but the present invention is not limited to the illustrated embodiment and various changes and modifications may be made without departing from the scope of the invention as set forth in the following claims.

We claim:

1. A spindle motor comprising a bracket, a rotor rotatably mounted relative to said bracket, bearing means disposed between said rotor and said bracket, a rotor magnet mounted to said rotor, a stator disposed in opposite relation to said rotor magnet, a magnetic fluid sealing means disposed outwardly of said bearing means, and a cap member disposed further outwardly of said magnetic fluid sealing means, wherein:

said cap member comprises an annular support portion having a substantially U-shaped cross-section, an attachment portion extending outwardly from the outer circumferential edge of said support portion in the radial direction, and a scatter preventing portion extending inwardly from the inner circumferential edge of said support portion in the radial direction, said attachment portion being mounted to said rotor, said support portion being supported to said magnetic fluid sealing means, a cut-out is formed from said support portion to said attachment portion of said cap member, whereby an adhesive for fixing said cap member is applied to spread from the outer side of said support portion to the inner side of said attachment portion through said cut-out.

2. A spindle motor according to claim 1, wherein said cut-out is extended from a part of said support portion to an edge of said cap member.

3. A spindle motor according to claim 2, wherein said cut-out is formed plural in number at equal intervals in the circumferential direction of said cap member.

* * * * *

UNITED STATES PATENT AND TRADEMARK OFFICE
CERTIFICATE OF CORRECTION

PATENT NO. : 5,536,986

DATED : July 16, 1996

INVENTOR(S) : Fukuyama et al.

It is certified that error appears in the above-indentified patent and that said Letters Patent is hereby corrected as shown below:

On the title page, item [62],
In the Section Related U.S. Application Data:

Please delete "Division of Ser. No. 4,098"
  and substitute
--Division of Ser. No. 4,980--

Signed and Sealed this

Twenty-ninth Day of October 1996

Attest:

BRUCE LEHMAN

Attesting Officer

Commissioner of Patents and Trademarks